United States Patent
Gadiraju et al.

(10) Patent No.: US 12,152,567 B2
(45) Date of Patent: Nov. 26, 2024

(54) METHOD FOR OPERATING A WIND FARM AND A WIND FARM

(71) Applicant: General Electric Renovables Espana, S.L., Barcelona (ES)

(72) Inventors: Kasi Viswanadha Raju Gadiraju, Bangalore (IN); Benjamin Palethorpe, Nantes (FR); Sumitha Mohan, Bangalore (IN); Shanmuga-Priyan Subramanian, Hamburg (DE)

(73) Assignee: General Electric Renovables España S.L., Barcelona (ES)

( * ) Notice: Subject to any disclaimer, the term of this patent is extended or adjusted under 35 U.S.C. 154(b) by 0 days.

(21) Appl. No.: 18/074,766

(22) Filed: Dec. 5, 2022

(65) Prior Publication Data
US 2023/0175491 A1 Jun. 8, 2023

(30) Foreign Application Priority Data
Dec. 6, 2021 (EP) .................................... 21212563

(51) Int. Cl.
*F03D 7/04* (2006.01)
*F03D 7/02* (2006.01)
*H02J 3/38* (2006.01)

(52) U.S. Cl.
CPC ............. *F03D 7/048* (2013.01); *F03D 7/028* (2013.01); *H02J 3/381* (2013.01); *H02J 3/388* (2020.01);
(Continued)

(58) Field of Classification Search
CPC ......... F03D 7/048; F03D 7/028; H02J 3/288; H02J 3/381; H02J 2300/28; F05B 2270/32
See application file for complete search history.

(56) References Cited

U.S. PATENT DOCUMENTS

| 9,217,418 B2 | 12/2015 | Bodewes et al. |
| 10,578,082 B2 | 3/2020 | Chen et al. |

(Continued)

FOREIGN PATENT DOCUMENTS

| EP | 2236821 A1 | 10/2010 |
| EP | 3238316 A1 | 11/2017 |
| WO | WO2021/023356 A1 | 2/2021 |

OTHER PUBLICATIONS

European Search Report Corresponding to EP21212563 on Jun. 24, 2022.
(Continued)

*Primary Examiner* — Sean Gugger
(74) *Attorney, Agent, or Firm* — Dority & Manning, P.A.

(57) ABSTRACT

A method for operating a wind farm having a string (S1-S3) of wind turbines (100-100c) which are electrically connectable with each other and a grid (510, 550) is disclosed. Each wind turbine includes a rotor (106) with rotor blades (108), a power conversion system (118, 210, 238) mechanically connected with the rotor (106), and at least one auxiliary subsystem (105, 109). The method includes operating the wind turbines of the string in an island operating mode in which the wind turbines are not connected with the grid, and the respective at least one auxiliary subsystem is supplied with electric power generated by the power conversion system of the respective wind turbine; detecting that the rotor of one of the wind turbines is exposed to a wind condition at which at least one of the rotor blades is at risk of stalling at the currently generated electric output power; and increasing the electric power generated by the power conversion system of the one of the wind turbines by an electric power amount which is sufficient for suppling the at least one auxiliary subsystem of at least one of the other wind turbines of the string.

13 Claims, 5 Drawing Sheets

(52) U.S. Cl.
CPC ... *F05B 2270/1033* (2013.01); *F05B 2270/32* (2013.01); *H02J 2300/28* (2020.01)

(56) References Cited

U.S. PATENT DOCUMENTS

| | | | |
|---|---|---|---|
| 2012/0146423 A1* | 6/2012 | Bodewes | H02M 7/49 307/84 |
| 2020/0400120 A1 | 12/2020 | Brogan et al. | |
| 2021/0047996 A1* | 2/2021 | Scholte-Wassink | F03D 7/045 |

OTHER PUBLICATIONS

Anubhav et al., Control Solutions for Blackstart Capability and Islanding Operations of Offshore Wind Power Plants, XP055560280, Proceedings of 17th Wind Integration Workshop, Oct. 17, 2018, 6 Pages.

\* cited by examiner

METHOD FOR OPERATING A WIND FARM AND A WIND FARM

FIELD

The present subject matter relates generally to operating a wind farm having wind turbines, in particular during a loss or absence of a grid the windfarm is connectable to, and to a respective wind farm.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Due to faults in the utility grid or other reasons, the wind farm may be disconnected from the utility grid. In this state, wind turbines may be required to supply power to its auxiliary loads to keep controllers, communication, yaw operation and other critical systems alive. This may be for safety reasons and/or to facilitate reconnecting the wind farm to the utility grid after grid recovery. Electric energy storage such as UPS which may be provided within the wind turbines, may only feed power to these critical systems for e.g. a few minutes during loss of grid. For longer periods, auxiliary power may be provided by diesel generators. In particular for offshore wind farms, diesel generators or the like may be too large and/or expensive to install, run, refill and/or maintain.

Accordingly, the present disclosure provides a method for operating a wind farm, and a computer program product or a computer-readable storage medium as described herein.

BRIEF DESCRIPTION

Aspects and advantages of the invention will be set forth in part in the following description, or may be obvious from the description, or may be learned through practice of the invention.

In one aspect, the present disclosure is directed to a method for operating a wind farm. The wind farm includes a string of wind turbines which are electrically connectable with each other and a grid. Each wind turbine includes a rotor including a rotor blade, a power conversion system mechanically connected with the rotor, and at least one auxiliary subsystem. The method includes operating the wind turbines of the string in an island operating mode in which the wind turbines are not connected with the grid, and the respective at least one auxiliary subsystem is supplied with electric power generated by the power conversion system of the respective wind turbine; determining that the rotor of one of the wind turbines is exposed to a wind condition at which the rotor blades of the one of the wind turbines is at risk of stalling at the currently generated electric output power (of the wind turbines power conversion system), and increasing the electric power generated by the power conversion system of the one of the wind turbines by an electric power amount which is sufficient for suppling the at least one auxiliary subsystem of at least one of the other wind turbines of the string.

In the following, this operating mode (of the one of the wind turbines) is also referred to a supply island operating mode. Further, the electric power amount which is sufficient for suppling the at least one auxiliary subsystem of at least one of the other wind turbines of the string is in the following also referred to as electric output power increase and electric surplus power (of the one of the wind turbines and its power conversion system, respectively).

Typically, the electric power generated by the power conversion system of the one of the wind turbines is increased by an electric power amount which at least substantially matches a power demand of the auxiliary subsystem(s) of at least one of the other wind turbines of the string, more typically several, a majority or even all other wind turbines of the string.

Due to increasing the electric power generated by the power conversion system of the wind turbine(s) the rotor blade(s) of which is at risk of stalling, stalling may safely be avoided at higher wind speeds. Accordingly, pitch demand and/or mechanical loads, in particular respective mechanical stress resulting in fatigue on the rotor blade(s) may be avoided at higher wind speed without affecting the energy supply of the wind turbines auxiliary subsystems.

Note that the auxiliary subsystem(s) of the wind turbines may e.g. only require auxiliary power equal to about 2-5% of the rated power of the power conversion system of the wind turbine at higher wind speeds. This may require the rotor blade(s) to be pitched to extreme values which would stall its operation. The increased power output will reduce pitch demand at higher wind speeds and thus avoids stall operation and undesired effects resulting therefrom such as reducing the life time of components, in particular the rotor blade(s). Furthermore, the storage capacity and/or size of battery energy storage system(s) of the wind turbines may be reduced. Thus, materials as well as costs for equipment and maintenance may be saved. In result, even the ecological footprint of the wind turbines may be reduced.

As used herein, the term "string of wind turbines" intends to describe that the wind turbines and their power conversion systems, respectively, are electrically connectable with each other to form a series circuit, in particular via respective power connections. For example, power cables and power switches arranged between adjacent wind turbines and their power conversion systems, respectively, may be used to electrically connect the wind turbines to each other (in pairs) and disconnect the wind turbines. However, it is also possible that a string includes wind turbines of different type and/or power rating.

Determining that the rotor of the one of the wind turbines is exposed to the wind condition typically includes determining that the rotor is exposed to a wind speed that is larger than a first threshold value corresponding to a wind speed at which stalling of the rotor blade is expected at the currently generated electric output power.

This may e.g. include detecting, in particular measuring and/or estimating the wind speed at, in front of and/or behind the rotor. Further, the detected (measured) wind speed and the currently generated electric output power may be used to determine that the rotor is exposed to the wind condition at which the rotor blade(s) is(are) at risk of stalling, for example using a look-up table.

In the following, the wind condition at which the rotor blade(s) of a wind turbine is(are) at risk of stalling at the currently generated or requested electric output power of its power conversion system is also referred to as stalling wind condition.

Typically, the electric power generated by the power conversion system of the one of the wind turbines is increased by the electric power amount (output power increase, electric surplus power) upon determining that the rotor of the one of the wind turbines is exposed to the stalling wind condition.

As used herein, the wording that "the rotor blade(s) of a wind turbine is(are) at risk of stalling at the currently generated or requested electric output power" intends to describe that the risk of stalling is currently high, for example at least 80%, more typically at least 90% or even 99%, and/or expected to be high soon, e.g. within one or a few seconds. The latter may be due to an expected increase of the wind speed.

Further, beside wind speed, an ambient temperature and/or a turbulence measure of the wind at, in front of and/or behind the rotor may be taken into account for determining the risk of stalling.

However, often it is sufficient to rely only on the wind speed to determine if the rotor of a wind turbine is exposed to a stalling wind condition. The wind speed may even be a global or averaged wind speed of the wind farm.

For example, a wind farm controller may be configured to send respective control commands (e.g. power commands) to individual controllers of the wind turbines of a string of wind turbines (of typically the same type) operating in island operating mode, if the wind speed is higher than the first threshold value for at least one of the wind turbines so that only one or at most a few of the wind turbines increase their power output while the remaining wind turbines stop power conversion and supply their auxiliary subsystem(s) with power received from the one or few of the wind turbines producing higher output power.

Accordingly, the electric surplus power may be used as a power supply for the auxiliary subsystem(s) of the at least one of the other wind turbines of the string In particular, the electric surplus power may be used as power supply for the other wind turbine(s) of the string that (are set to) operate in an idling operating mode or a stand still operating mode. Both in the idling operating mode and the stand still operating mode, the respective power conversion system does not output electric power.

Operating the other wind turbine(s) of the string in idling operating mode may be preferred compared to operating in the stand still operating mode. This is because reconnecting the wind turbine(s) of the string to a recovered grid and operating the wind turbine in a normal operating mode again may be facilitated when the wind turbines are already operating in the idling operating mode.

During operating the wind turbine in the normal operating mode, the power conversion system converts input motive power received from the rotor into electrical output power and provides at least a major portion of the electrical output power to the (utility) grid.

As the power demand of the other wind turbine(s) may vary over time, the electric surplus power may be updated in accordance with the power demand of the of the other wind turbine(s). For example, the power demand of the other wind turbine(s) may become lower after any rechargeable energy storage is recharged.

These steps are typically controlled by a control system of the wind farm, in particular a control system provided by a wind farm controller and wind turbine controllers. This typically applies to any method and method steps explained herein.

The electric power generated by the power conversion system of the one of the wind turbines may be increased by a factor of at least three, more typically at least 5 or even at least 8 to additionally supply a respective number of other wind turbines operated in idling operating mode or a stand still operating mode.

For example, the electric power generated by the power conversion system of the one of the wind turbines may be increased by an electric output power increase which is sufficient for suppling the auxiliary subsystem(s) of at least four of the other wind turbines of the string, typically of at least nine of the other wind turbines of the string. Further, the electric power generated by the power conversion system of the one of the wind turbines may, depending on wind speed and the wind turbines, be increased by an electric output power increase which is sufficient for suppling the auxiliary subsystem(s) of up to 20 or even 25 wind turbines.

The typically predetermined first threshold value may be in a range from about 14 m/s to about 15 m/s.

However, the first threshold value is typically dependent on the particular design (type) of the wind turbine.

After determining that the rotor of the one of the wind turbines is exposed to a further wind condition at which the risk of stalling is small, for example at most a few percent, typical below 1 percent, in particular at least substantially zero (e.g. less than 0.5 percent or even 0.0.1 percent) if the electric output power of the conversion system is reduced to a value at least substantially matching a current or expected power demand of the auxiliary subsystem(s) of the wind turbines operating in supply island mode, all wind turbines of the string may return to operate/may operate again in the respective island operating mode.

Determining that the rotor of the one of the wind turbines is exposed to the further wind condition typically includes determining that the rotor is exposed to a wind speed smaller than a second a threshold value which is lower than the first threshold value, typically about 10% to 50% lower than the first threshold value, more typically about 30% to 36% lower than the first threshold value.

In one aspect, the present disclosure is directed to a method for operating a wind farm. The wind farm includes a string of wind turbines which are electrically connectable with each other and a grid. Each wind turbine includes a rotor including a rotor blade, a power conversion system mechanically connected with the rotor, and at least one auxiliary subsystem. The method includes operating the wind turbines of the string in an island operating mode in which the wind turbines are not connected with the grid, and the at least one auxiliary subsystems are supplied with electric power generated by the power conversion system of the respective wind turbine, determining that at least one of the rotors of the wind turbines is exposed to a wind condition at which the rotor blade of the at least one of the rotors is at risk of stalling at the currently generated electric output power; and increasing the electric power generated by the power conversion system of one of the wind turbines by an electric output power increase (electric surplus power) which is sufficient for suppling the at least one auxiliary subsystem of at least one of the other wind turbines of the string.

The method typically further includes operating the at least one of the other wind turbines in an idling operating mode or a stand still operating mode, and using the electric output power increase for supplying the at least one auxiliary subsystem of the at least one of the other wind turbines.

Typically, the power output of only one wind turbine is increased, in particular one of the wind turbines, of a string, for which the rotor is exposed to the stalling wind condition.

In one aspect, the present disclosure is directed to a method for operating a wind farm. The wind farm includes a string of wind turbines which are electrically connectable with each other and a grid. Each wind turbine includes a rotor including a rotor blade, a power conversion system mechanically connected with the rotor, and at least one auxiliary subsystem. The method includes operating the wind turbines of the string in an island operating mode in which the wind turbines are not connected with the grid, and the at least one auxiliary subsystems are supplied with electric power generated by the power conversion system of the respective wind turbine, determining that the rotor of (at least) one of the wind turbines is exposed to a wind having a wind speed that is larger than a first threshold value corresponding to a wind speed at which at least one of the rotor blades of the one of the wind turbines is at risk of stalling at the currently generated electric output power; and operating the other wind turbines in an idling operating mode or a standstill operating mode and supplying the at least one auxiliary subsystem of the other wind turbines with electric power additionally provided by the power conversion system of the at least one wind turbine.

In one embodiment the wind farm has several strings of wind turbines, wherein the strings are separately connectable with a point of common coupling of the wind farm connectable to an external grid. In this embodiment, the methods explained above are typically performed independently for each of the several strings.

In one aspect, the present disclosure is directed to a wind farm. The wind farm includes a string of wind turbines which are electrically connectable with each other and a grid. Each wind turbine includes a rotor including a rotor blade, a power conversion system mechanically connected with the rotor, and at least one auxiliary subsystem. The wind farm further includes a control system communicatively coupled with the power conversion system of the wind turbines and configured to operate the wind turbines of the string in an island operating mode in which the wind turbines are not connected with the grid, and the at least one auxiliary subsystem is supplied with electric power generated by the power conversion system of the respective wind turbine, to determine that the rotor of one of the wind turbines is exposed to a wind condition at which at least one of the rotor blades of the one of the wind turbines is at risk of stalling at the currently generated electric output power; and to increase the electric power generated by the power conversion system of the one of the wind turbines by an electric power amount which is sufficient for suppling the at least one auxiliary subsystem of at least one of the other wind turbines of the string.

The control system is typically communicatively coupled with a sensor for determining a wind speed at or in front of the rotor of the wind turbines. Determining the wind speed may include measuring wind speed values. Further, the wind speed may be determined as an estimated wind speed based on the measured wind speed values.

For example, the control system may be communicatively coupled with a respective sensor for determining a wind speed at, in front of and/or behind the rotor of each of the wind turbines, and to determine the risk of stalling based on the determined wind speed(s).

Typically, control system is configured to determine the risk of stalling based on the determined wind speed(s) and optionally on the current power output.

According to an embodiment, the control system includes a wind farm controller and a respective wind turbine controller for each power conversion system.

The wind farm controller is communicatively coupled with the wind turbine controller, and may be operable as a primary controller, whereas the wind turbine controllers may be operable are as secondary controllers.

The turbine controllers may be configured to control the respective wind turbine in different modes, in particular island operating mode, supply island operating mode, idling mode and/or stand still mode.

Typically, the control system is configured to control the power conversion system of the wind turbine(s) operating in supply island mode such that the generated electric output power is sufficient for additionally suppling the at least one auxiliary subsystems of at least 4 of the other wind turbines of the string, typically of at least 9 of the other wind turbines of the string.

The term "auxiliary subsystem" as used herein intends to describe systems of the wind turbine which may be desired and/or consume electrical power at least from time to time when the wind turbine is operated in an idling operating mode and/or a stand still operating mode. Accordingly, the term "auxiliary subsystem" includes operational subsystems used during idling operating mode and/or stand still operating mode.

In particular, each of the wind turbines may include one or more, typically several or even all of the following auxiliary subsystems: a pitch system, a yaw system, a heating system, a cooling system, a hydraulic system, and a rechargeable energy storage devices such as a UPS.

The wind turbines may include several respective heating system and/or cooling systems, for example for a generator, a converter and/or a transformer of the respective power conversion system.

Further, a rotor blade heating and/or rotor blade deicing subsystem may be provided as respective auxiliary subsystem for wind turbines in wind farms operating in cold regions.

Furthermore, wind turbines may include several rechargeable energy storage devices for different components.

Even further, the turbine controller, measurement devices and any communication device may also be considered as auxiliary subsystems.

The wind farm may include several strings of wind turbines. In this embodiment, the control system is typically configured to control the several strings of wind turbines independently of each other when not connected with the grid (and each other).

Further, the wind farm may be an offshore wind farm but also an onshore wind farm.

Typically, the wind farm is configured to perform the method as explained herein.

In yet another aspect, the present disclosure is directed to a computer program product or a non-transitory computer-readable storage medium comprising instructions which, when executed by one or more processors of a system, in particular a control system of the wind farm as explained herein, cause the system to carry out the method as explained herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
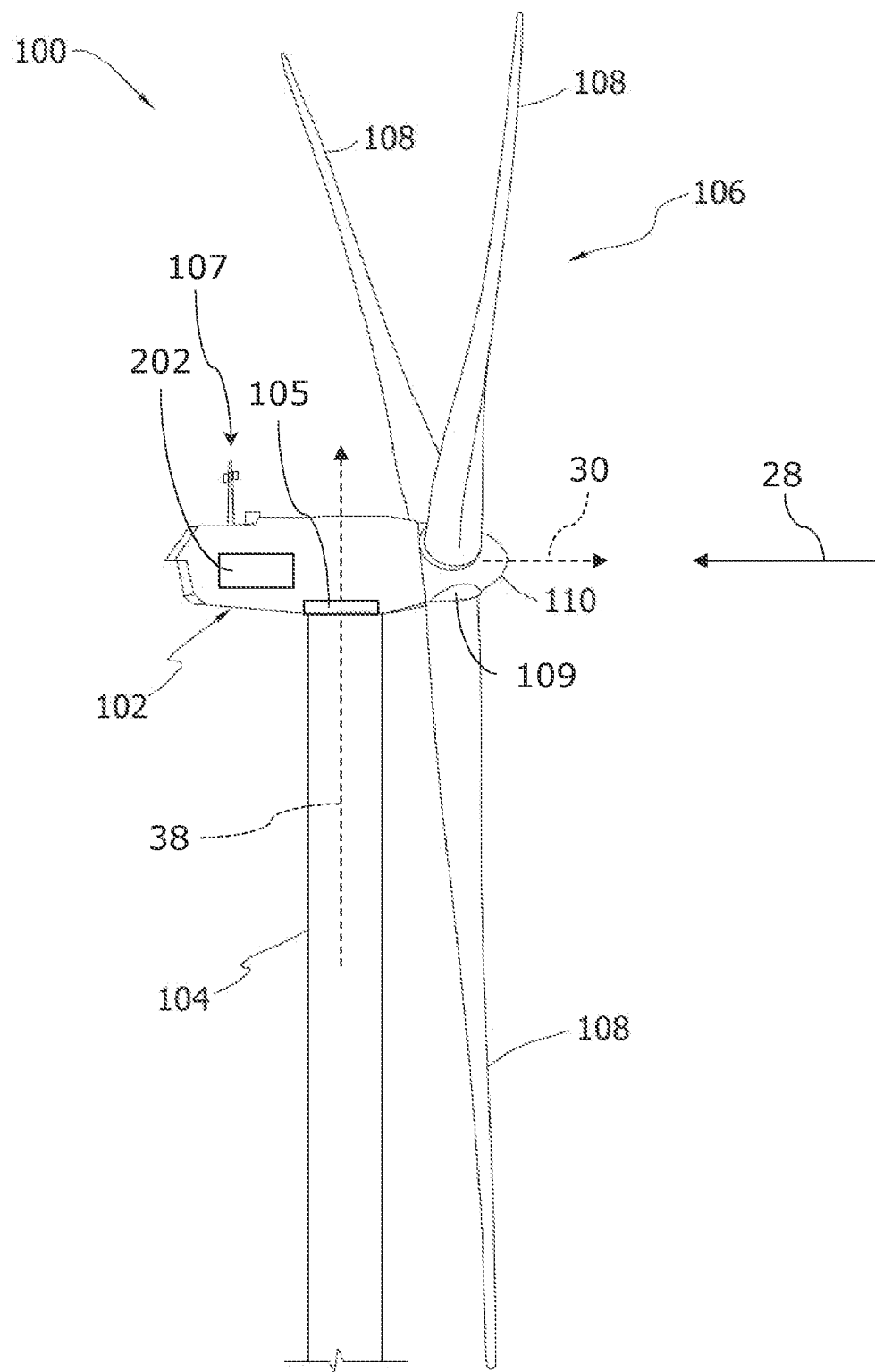
FIG. 1 illustrates a perspective view of one embodiment of a wind turbine that may be part of a wind farm according to the present disclosure.

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 91 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m. As wind strikes the rotor blades 108 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 108, i.e., an angle that determines a perspective of the rotor blades 108 with respect to the wind direction, may be changed by a pitch system 109 to control the load and power generated by the wind turbine 100 by adjusting an angular position of at least one rotor blade 108 relative to wind vectors. During operation of the wind turbine 100, the pitch system 109 may change a pitch angle of the rotor blades 108 such that the rotor blades 108 are moved to a feathered position, such that the perspective of at least one rotor blade 108 relative to wind vectors provides a minimal surface area of the rotor blade 108 to be oriented towards the wind vectors, which facilitates reducing a rotational speed and/or facilitates a stall of the rotor 106.

A blade pitch of each rotor blade 108 may be controlled individually by a wind turbine controller 202 or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system 105, about a yaw axis 38 to position the rotor 106 with respect to wind direction 28.

The yaw system 105 may include a yaw drive mechanism provided by nacelle 107.

Further, yaw system 105 may also be controlled by wind turbine controller 202.

Figure 2:
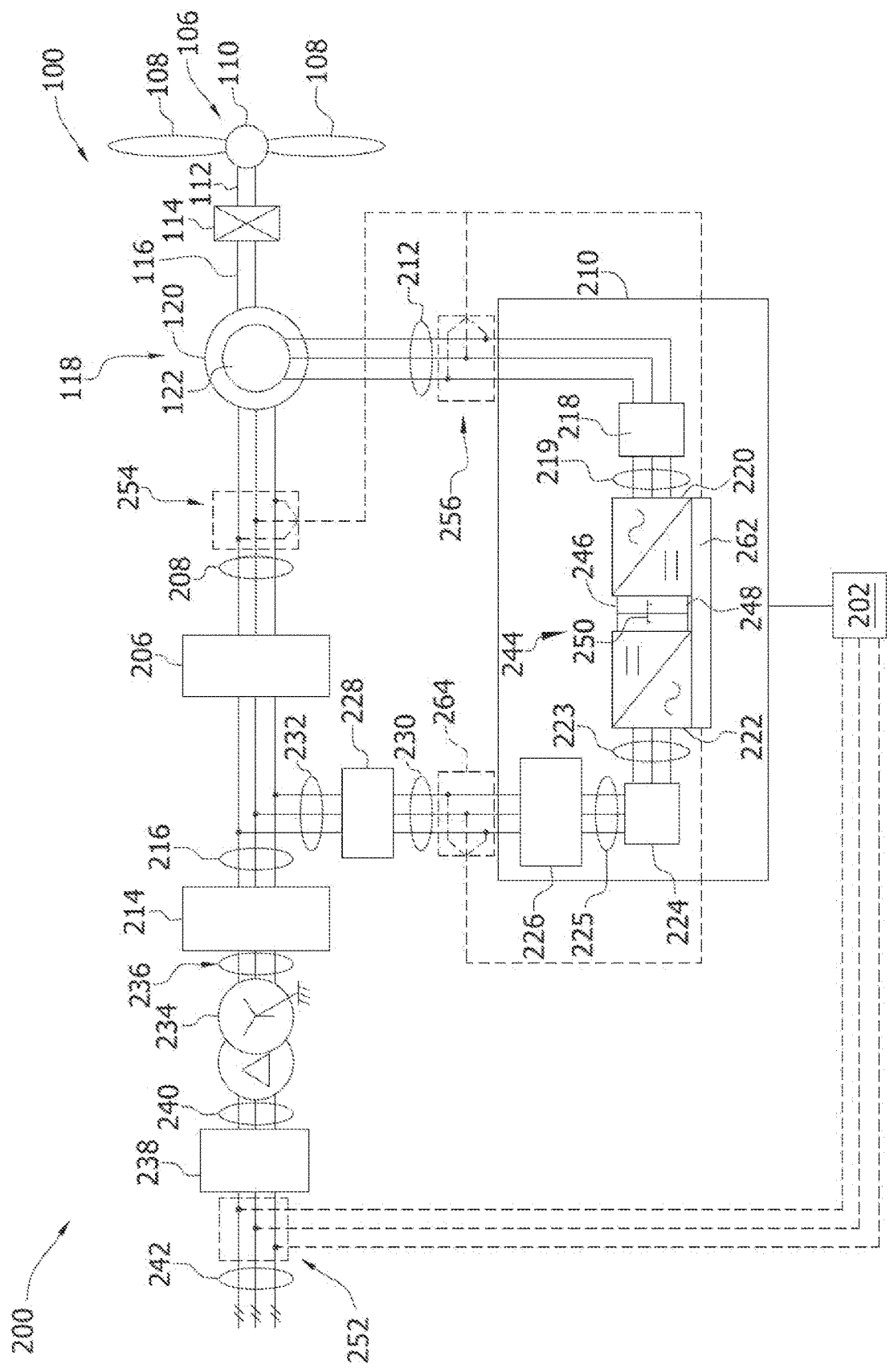
FIG. 2 illustrates a schematic view of one embodiment of an electrical power system and a control system suitable for use with the wind turbine shown in FIG. 1.

For positioning nacelle 102 appropriately with respect to the wind direction 28 as well as detecting a wind speed, the nacelle 102 may also include at least one meteorological mast 107 that may include a wind vane and anemometer (neither shown in FIG. 2). The mast 107 may provide information to the wind turbine controller 202 regarding ambient conditions. This may include wind direction and/or wind speed as well as ambient temperature, ambient moisture, precipitation type and/or amount (if any).

In the exemplary embodiment, the wind turbine controller 202 is shown as being centralized within the nacelle 102, however, the wind turbine controller may also be a distributed system throughout the wind turbine 100, on a support system (not shown in FIG. 1), within a wind farm, and/or at a remote control center. The wind turbine controller 202 includes a processor configured to perform the methods and/or steps described herein.

Referring now to FIG. 2, a schematic view of one embodiment of an electrical (power) and control system 200 that may be used with the wind turbine 100 is illustrated. During operation, wind impacts the blades 108 and the blades 108 transform wind energy into a mechanical rotational torque that rotatably drives a low-speed shaft 112 via the hub 110.

In the exemplary embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Alternatively, system 200 is configured as a full power conversion system (not shown) known in the art, wherein a full power conversion assembly (not shown) that is similar in design and operation to assembly 210 is electrically coupled to stator 120 and such full power conversion assembly facilitates channeling electrical power between stator 120 and an electric power transmission and distribution grid (not shown). Stator bus 208 transmits three-phase power from stator 120 and rotor bus 212 transmits three-phase power from rotor 122 to assembly 210. Stator synchronizing switch 206 is electrically coupled to a main transformer circuit breaker 214 via a system bus 216.

Due to the high possible power rating at given size/costs, wind turbines with full power conversion assembly are widely used in offshore wind farms.

In addition, the electrical power and control system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
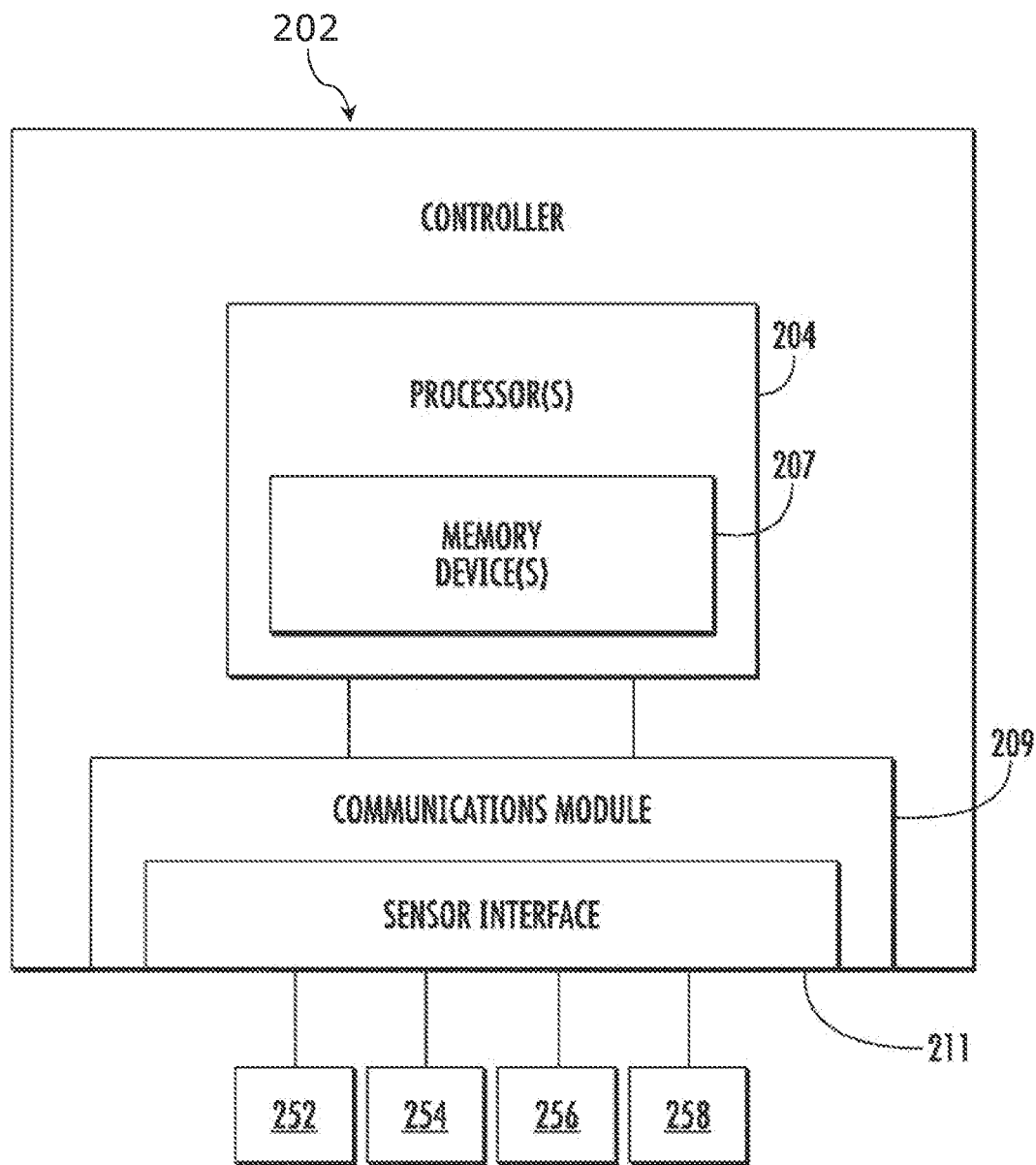
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

The sensors 252, 254, 256 may be sensor for currents and/or voltages desired for controlling the power conversion of wind turbine 100. This is explained in more detail below.

Further, at least one additional sensor (not shown) may be provided for sensor data referring to meteorological data, e.g. sensor(s) provided by the meteorological mast 107 shown in FIG. 1. The at least one additional sensor may in particular include a sensor for determining a wind speed at or in front of rotor 106 of wind turbine 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system as described herein. As a further alternative, electrical and control system is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, power conversion assembly 210 electrically coupled to generator 118 and step-up transformer 234 form the power conversion system of wind turbine 100.

Typically, the power conversion system at least includes a generator and a power conversion assembly including a power converter, in particular an indirect AC-to-AC power converter (AC/DC-AC converter) or a matrix converter, for example a respective full converter or DFIG converter depending on the generator.

Figure 4:
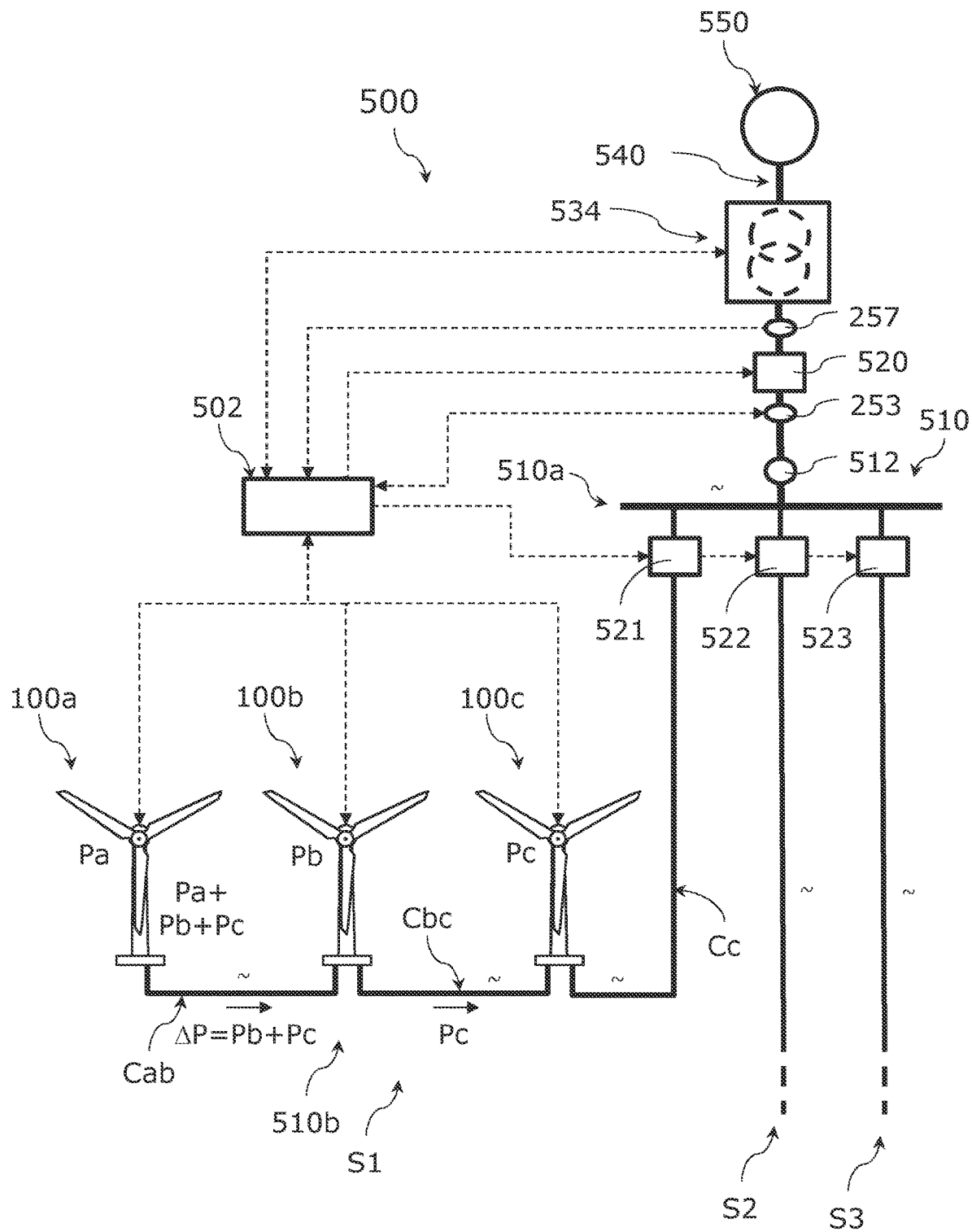
FIG. 4 illustrates a block diagram of one embodiment of a wind farm according to the present disclosure.

FIG. 4 illustrates a block diagram of a wind farm 500. In the exemplary embodiment, wind farm 500 is an offshore wind farm.

Wind farm 500 has several strings S1-S3 of wind turbines. For sake of clarity, only string S1 is shown in more detail in FIG. 4. Each of the other strings S2, S3 may be similar or even equal to string S1. However, at least the number of wind turbines and length of string may vary between the strings S1-S3.

For sake of clarity, strings S1 includes three exemplary wind turbines 100a, 100b, 100c, for example three wind turbines as explained above with regard to FIG. 1 to FIG. 3. However, string S1 may also have at least five or at least ten wind turbines.

The wind turbines 100a, 100b, 100c are electrically connected with each other via power cables Cab, Cbc (and closed power switches not shown).

Further, the wind turbines 100a, 100b, 100c are electrically connectable with a power grid bus 510a of a local wind farm grid 510 via a feeder (power cable) Cc and a circuit breaker 521. Respective circuit breakers 522, 523 are also provided for wind turbine strings S2, S3.

The power cables Cab, Cbc and the feeder Cc may be implemented as respective undersea cables.

FIG. 4 illustrates a state of wind farm 500 in which the circuit breakers 521-523 are open and the strings S1-S3 disconnected from power grid bus 510a and the (onshore) utility grid 550, for example in response to a failure of utility grid 550 or in the electrical connection between local wind farm grid 510 and utility grid 550.

In the exemplary embodiment, a point of common coupling (PCC) of local grid 510 is connectable with utility grid 550 via a main circuit breaker 520 (illustrated in open state), a grid substation 534 and a power link 540 which is typically implemented as an undersea cable.

In the exemplary embodiment, wind farm 500 is an offshore wind farm. However, the embodiments explained below can also be applied to onshore wind farms using a power link 540 to transmit power to a distant (utility) grid.

Power link 540 may either be a DC-link, in particular a high voltage DC-link (HVDC-link) or an AC-link, in particular a high voltage AC-link (HVAC-link).

In embodiments in which the wind farm 500 is electrically connectable to grid 550 using an AC link 540, (offshore) wind farm grid substation 534 connectable between local AC-grid and power link 540 typically includes a grid transformer as indicated by the dashed electric symbol in box 534.

In embodiments in which the wind farm 500 is electrically connectable to grid 550 using a DC link 540, wind farm grid substation 534 includes an AC-DC power converter (power inverter).

Note that the main circuit breaker 520 and/or one or more sensors 257 for measuring currents and/or voltages at the lower voltage side and/or the high voltage side (not shown in FIG. 4) of grid substation 534 may also be provided by the substation 534.

As indicated by the dashed arrows in FIG. 4, a wind farm controller 502 is communicatively coupled with the wind turbines 100a-100c, more particular its turbine controllers (not shown in FIG. 4), the circuit breaker 520-523, the sensors 253, 257 and the optional substation 534.

In this embodiment, wind farm controller 502 and wind turbine controllers 202 together form a control system which is communicatively coupled with the power conversion systems and the auxiliary subsystems of the wind turbines 100a-100c.

Wind farm controller 502 is typically directly communicatively coupled with the turbine controllers, the substation 534 and the main circuit breaker 520. Further, wind farm controller 502 may be directly or via the turbine controllers communicatively coupled with current sensors 253, 257, meteorological data sensors provided by the wind turbines 100a-100c, and circuit breakers 521-523.

The general design of the wind farm controller 502 may at least substantially corresponds to the design of the wind turbine controller as explained above with regard to FIG. 3. However, wind farm controller 502 may be more complex and/or more powerful. Further, wind farm controller 502 typically operates as a primary controller supervising the wind turbine controllers during controlling the wind turbines in normal operating mode, idling operating mode and stand still operating mode. For example, wind farm controller 502 may provide SCADA (Supervisory Control And Data Acquisition) functionality for wind farm 500.

In the illustrated state of wind farm 500, circuit breakers 520-523 are open. Accordingly, strings S1-S3 of wind farm 500 are electrically disconnected from each other and utility grid 550. This may be due to an outage or another failure of utility grid 550 that may e.g. be detected using data provided by sensor 257.

In this state and after disconnecting wind farm 500 from utility grid 550, respectively, the wind turbines 100a-100c of the string S1 as well as the not shown wind turbines of string S2, S3 are instructed by wind farm controller 502 to operate in a respective island operating mode in which each turbine controller controls the power conversion system of the respective wind turbine 100a-100c so that the power demand of the wind turbine and its auxiliary subsystems is at least substantially matched by the electric power Pa, Pb, Pc generated by the respective power conversion system.

Wind turbines 100a-100c may be operated safely in this mode for a longer period as long as wind speed is low enough.

Upon detecting that the wind speed is larger than a first threshold value corresponding to a wind speed at which stalling of rotor blades is expected for one or all of the wind turbines 100a-100c, e.g. by the wind farm controller 502 typically receiving metrological data such as wind speed and currently used power setpoints from the wind turbine controllers, is exposed to the stalling wind condition, the power conversion system of one of the wind turbines (wind turbine 100a in the exemplary embodiment) is commanded (and controlled, e.g. by its corresponding turbine controller) to increase the electric power from Pa by an electric surplus power $\Delta P=Pb+Pc$ not required by wind turbine 100a but sufficient to meet or even match the power demands of the auxiliary subsystems, respectively, of the other wind turbines 100b, 100c of string S1.

The electric surplus power $\Delta P$ may be transferred through power cables Cab, Cbc to wind turbines 100b, 100c operated in idling operating mode.

Typically, the wind turbines 100b, 100c are controlled in idling operating mode by their turbine controller on request of wind farm controller 502.

In the following methods are explained that may be performed by wind farm 500 and/or controlled by the control system of wind farm 500.

Figure 5A:
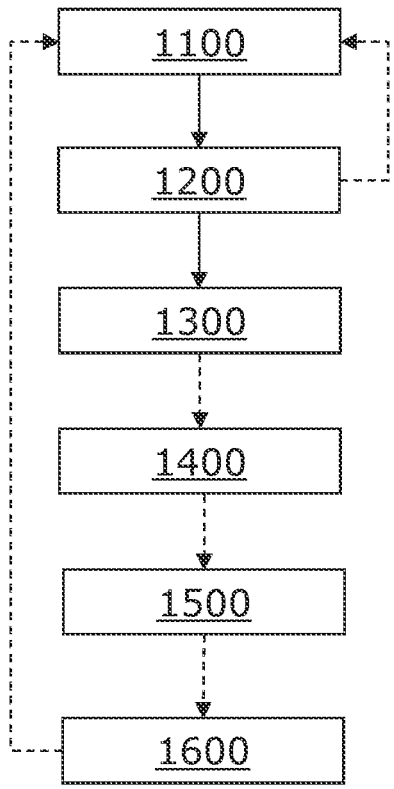
FIG. 5A illustrates a flow chart of a method according to an embodiment of the present disclosure.

FIG. 5A illustrates a flow chart of a method 1000 for operating a wind farm, in particular a wind farm as explained above with regard to FIG. 4.

In a first block 1100, the wind turbines of one or more wind farm strings, which are disconnected from a utility grid and each other, are operated in an island operating mode so that the power conversion system of each wind turbine produces output electric power which at least substantially and/or on average matches the power demand of the respective wind turbine and its auxiliary subsystems, respectively.

Thereafter and while the wind turbines operate in island operating mode, it is checked in a subsequent block 1200 if a rotor of one of the wind turbines is exposed to a wind condition at which the rotor blade(s) are at risk of stalling at the currently generated electric output power of the connected power conversion system. If so, method 1000 is continued with block 1300. Otherwise, method 1000 returns to block 1100.

In block 1300, the electric power generated by the power conversion system of one of the wind turbines is increased by an electric surplus power which is sufficient for suppling the auxiliary subsystems of one, typically all of the other wind turbines of the string which receive and use respective portions of the electric surplus power in block 1400 for supplying their auxiliary subsystems while operating in idling mode in block 1500.

If it is determined that the rotors of the wind turbines, in particular the rotor of the wind turbine which outputs the electric surplus power is no longer exposed to a wind condition that results in a (sufficiently high) risk of stalling when returning to the normal island operating mode again, method 1000 returns to block 1100. Otherwise, the respective current operating modes of the wind turbines are maintained.

Figure 5B:
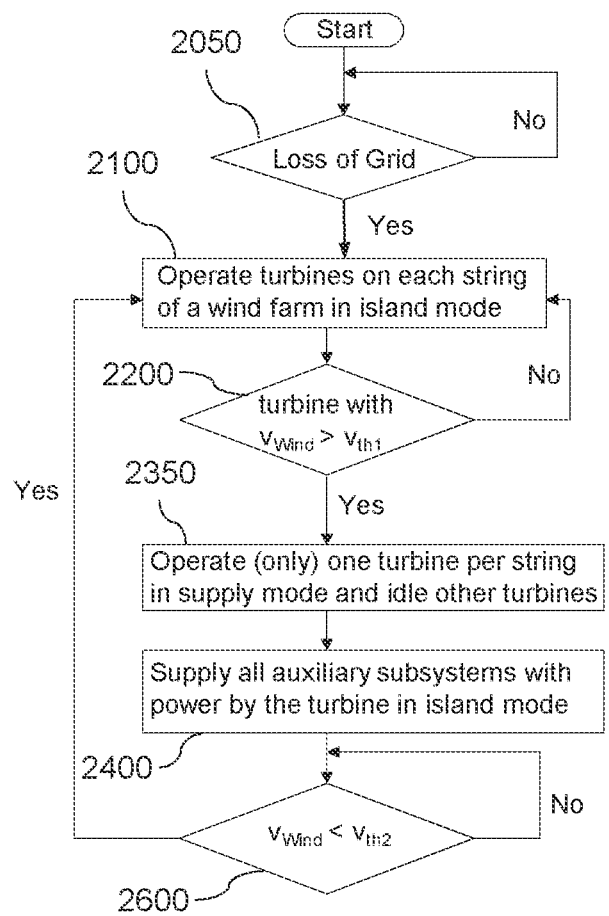
FIG. 5B illustrates a flow chart of a method according to an embodiment of the present disclosure.

FIG. 5B illustrates a flow chart of a method 2000 for operating a wind farm, in particular a wind farm as explained above with regard to FIG. 4. Method 2000 may be similar to method 1000 but is more specific.

In a first block 2050, it is checked if a loss or failure or unavailability of a utility grid the wind farm is/has been feeding output power to is detected.

If so, at least the strings of wind turbines of the wind farm are disconnected from the utility grid (and each other).

Thereafter, the wind turbines are operated in island (operating) mode in block 2100.

In a subsequent block 2200, it is checked if one or more wind turbines of each string are exposed to wind speeds exceeding a (respective) first threshold value corresponding to a wind speed at which stalling of the rotor blade is expected at the currently generated electric output power.

If so, one wind turbine per string of wind turbines operates in a supply island mode and the other wind turbines of the strings operate in idling operating mode in which their auxiliary subsystems are supplied by electric surplus power provided by the respective wind turbine operating in supply island mode, in blocks 2350, 2400.

Otherwise, the wind turbines maintain operating in (normal) island operating mode.

In a subsequent block 2600, it is checked if all wind turbines are exposed to wind speeds lower than a second threshold value which is lower than the first threshold value and at which stalling is not expected for the wind turbines when returning to normal island operating mode again.

If so, method 2000 may return to block 2100.

Otherwise, the current operating modes of the wind turbines are maintained.

Figure 5C:
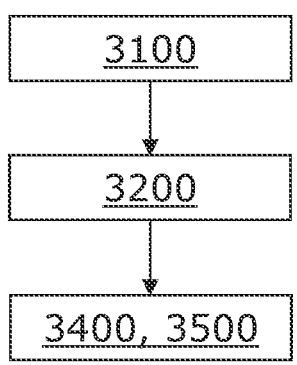
FIG. 5C illustrates a flow chart of a method according to an embodiment of the present disclosure.

FIG. 5C illustrates a flow chart of a method 3000 for operating a wind farm, in particular a wind farm as explained above with regard to FIG. 4.

Similar as explained above for method 1000, 2000, the wind turbines of each string are, in a block 3100, operated in a normal island operating mode in which the wind turbines are not connected with the utility grid, and the wind turbines auxiliary subsystems supplied with electric power generated by the power conversion system of the respective wind turbine.

Upon detecting in a block 3200 that at least one of the rotors of the wind turbines is exposed to a wind condition at which the rotor blade(s) of the at least one of the rotors is at risk of stalling at the currently generated electric output power, the electric power generated by the power conversion system of one (typically only one) of the wind turbines is increased, in block 3400, by an electric surplus power which is used for suppling the auxiliary subsystems of the other wind turbines of the string operated in idling operating mode, in block 3500.

Methods 1000, 2000, 3000 may be performed until grid recovery is detected.

Thereafter, the wind farm may be reconnected to the utility grid.

Exemplary embodiments of wind farms and methods for operating wind farms are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 204 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 204 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. For example, the control system of the wind farm may be provided by one centralized controller or a plurality of interconnected controllers. Such other examples are intended to be within the scope of the claims if they have structural elements that do not differ from the literal language of the claims, or if they include equivalent structural elements with insubstantial differences from the literal language of the claims.

REFERENCE NUMBERS wind turbine 100-100c
nacelle 102
tower 104
yaw system 105
rotor 106
meteorological mast 107
blades 108
pitch system 109
hub 110
low speed shaft 112
gearbox 114
high-speed shaft 116
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238
breaker-side bus 240
grid bus 242, 510a
DC link 244
positive rail 246
negative rail 248
capacitor 250
electric current sensors 252
electric current sensors 253
electric current sensors 254
electric current sensors 256
electric current sensors 257
meteorological data sensors 258
converter controller 262
electric current sensors 264
(offshore) wind farm 500
wind farm controller 502
local (AC) grid 510
Subgrid of 510 510b
PCC 512
circuit breaker 520-523
(offshore) grid substation 534
(HVDC-) link to utility grid 540
(onshore) utility grid 550
Cable connection/feeder Cab-Cc
Strings of wind turbines S1, S2, S3
method, method steps 1000-3500

The invention claimed is:

1. A method for operating a wind farm having a string of wind turbines electrically connectable with each other and a grid, each wind turbine including a rotor with at least one rotor blade, a power conversion system mechanically connected with the rotor, and an auxiliary subsystem, the method comprising:
operating the wind turbines in the string in an island operating mode wherein the wind turbines are not connected with the grid, and each wind turbine in the string supplies electric power generated by the power conversion system of the wind turbine to the auxiliary subsystem in the wind turbine;
determining that the rotor of one of the wind turbines in the string is exposed to a wind condition that places the wind turbine at risk of stalling at the generated electric output power of the wind turbine;
increasing the electric power generated by the power conversion system of the at-risk wind turbine by an electric power amount that is sufficient for supplying the auxiliary subsystem of at least one of the other wind turbines of the string;
determining that the rotor of the at-risk wind turbine is exposed to a further wind condition at which the risk of stalling is substantially zero if the electric output power of the conversion system of the at-risk wind turbine is reduced to the power demand of the auxiliary subsystem of the at-risk wind turbine; and
changing operation of the at-risk wind turbine to the island operating mode of the other wind turbines in the string.

2. The method of claim 1, wherein determining the at-risk wind turbine comprises determining that the rotor is exposed to a wind speed larger than a first threshold value corresponding to a wind speed at which stalling of the rotor blade is expected.

3. The method of claim 2, wherein the first threshold value is in a range of 14 m/s to 15 m/s.

4. The method of claim 1, wherein the electric power is increased for one power conversion system only in the string, and further comprising at least one of:
using the increased electric power amount as a power supply for at least one of the other wind turbines of the string;
operating the at least one of the other wind turbines in an idling operating mode or a stand still operating mode; or
updating the increased electric power amount in accordance with a power demand of the at least one of the other wind turbines.

5. The method of claim 1, wherein determining that the rotor of the at-risk wind turbine is exposed to the further wind condition comprises determining that the wind speed is smaller than a second threshold value lower than a first threshold value corresponding to a wind speed at which stalling of the rotor blade is expected.

6. The method of claim 1, wherein the increased electric power from the at-risk wind turbine is sufficient for suppling the auxiliary subsystem of at least four other wind turbines in the string.

7. The method of claim 1, wherein the wind farm includes a plurality of the strings of wind turbines, wherein each of the strings are separately connectable with a point of common coupling of the wind farm to an external grid, and wherein the method is performed independently for each of the strings of wind turbines.

8. A wind farm comprising:
- a string of wind turbines that are electrically connectable to each other and a grid;
- each of the wind turbines comprising a rotor with rotor blades, a power conversion system mechanically connected with the rotor, and an auxiliary subsystem;
- a control system communicatively coupled with the power conversion system of each of the wind turbines, the control system configured to perform the following:
- operate the wind turbines in the string in an island operating mode wherein the wind turbines are not connected with the grid, and each wind turbine in the string supplies electric power generated by the power conversion system of the wind turbine to the auxiliary subsystem in the wind turbine;
- determine that the rotor of one of the wind turbines in the string is exposed to a wind condition that places the wind turbine at risk of stalling at the generated electric output power of the wind turbine;
- increasing the electric power generated by the power conversion system of the at-risk wind turbine by an electric power amount that is sufficient for supplying the auxiliary subsystem of at least one of the other wind turbines of the string;
- determining that the rotor of the at-risk wind turbine is exposed to a further wind condition at which the risk of stalling is substantially zero if the electric output power of the conversion system of the at-risk wind turbine is reduced to the power demand of the auxiliary subsystem of the at-risk wind turbine; and
- changing operation of the at-risk wind turbine to the island operating mode of the other wind turbines in the string.

9. The wind farm of claim 8, wherein the control system is communicatively coupled with a sensor for determining a wind speed at or in front of the rotor of the wind turbines, wherein the risk of stalling is determined based on the determined wind speed.

10. The wind farm of claim 8, wherein the control system comprises a wind farm controller communicatively coupled to a respective wind turbine controller for the power conversion system of each of the wind turbines, wherein the wind farm controller is operable as a primary controller and the wind turbine controllers are operable are as secondary controllers configured to control the respective wind turbine in the island operating mode, and wherein the control system is configured to control the power conversion system of the at-risk wind turbine such that the increased electric is sufficient to supply the auxiliary subsystems of at least four other wind turbines in the string.

11. The wind farm of claim 8, wherein the wind farm comprises a plurality of the strings of wind turbines, and wherein the control system is configured to control each of strings of wind turbines independently of each other.

12. The wind farm of claim 8, wherein the auxiliary subsystem comprises one of: a pitch system, a yaw system, a heating system, a cooling system, a hydraulic system, or a rechargeable energy storage.

13. The wind farm of claim 8, wherein the wind farm is an offshore wind farm.

* * * * *